No. 720,643. PATENTED FEB. 17, 1903.
J. W. WALLACE.
FISHING TACKLE.
APPLICATION FILED JUNE 4, 1902.
NO MODEL.
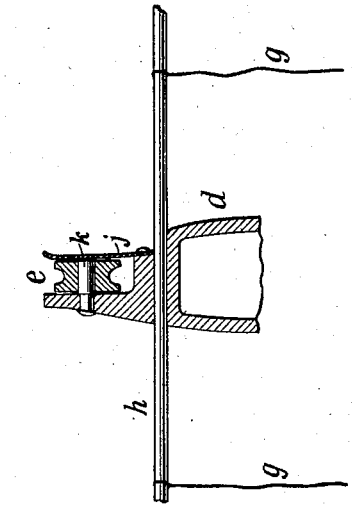
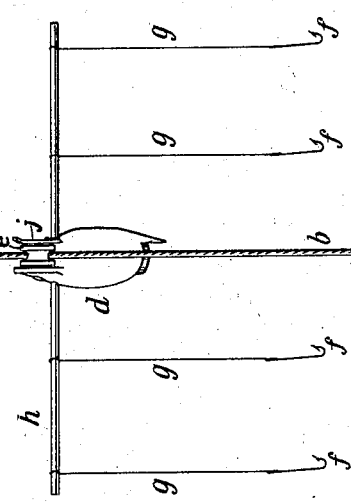
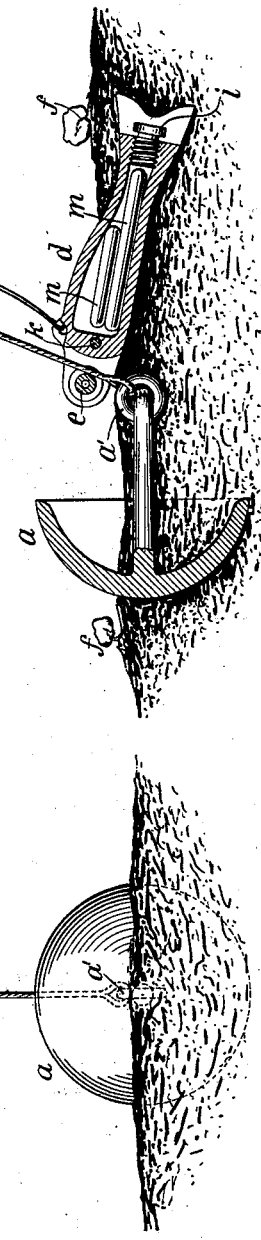
Witnesses:
John H. Barnes
A. McCutoch
John W. Wallace
Inventor
by Henry D. Williams
Atty

UNITED STATES PATENT OFFICE.

JOHN W. WALLACE, OF JERSEY CITY, NEW JERSEY.

FISHING-TACKLE.

SPECIFICATION forming part of Letters Patent No. 720,643, dated February 17, 1903.

Application filed June 4, 1902. Serial No. 110,141. (No model.)

*To all whom it may concern:*

Be it known that I, JOHN W. WALLACE, a citizen of the United States, residing at Jersey City, in the county of Hudson and State of New Jersey, have invented certain new and useful Improvements in Fishing-Tackle, of which the following is a specification, reference being had therein to the accompanying drawings.

My invention relates to fishing-tackle, and has for its principal objects to prevent entangling or confusion of fishing-lines and to permit the fisherman to select and maintain a desired point of fishing on the bed or bottom of the sea.

According to my invention I provide a guide-line and anchor which may be located as desired, with the anchor engaged with the bed or bottom, and a fish-line and sinker and hooks, which may be raised or lowered and will be guided while being raised or lowered by the guide-line.

My invention includes various improvements in the construction and combination of parts, as hereinafter fully explained.

I will now describe the construction of fishing-tackle illustrated in the accompanying drawings and will thereafter point out my invention in claims.

Figure 1 is an elevation, partly in section, showing my fishing-tackle in position at the bed or bottom. Fig. 2 is a front view of the same, showing the fish-line, sinker, and hooks in a position which they would occupy when being raised or lowered or with the sinker elevated above the bed or bottom. Fig. 3 is an enlarged sectional detail of part of the sinker and spreader.

The anchor $a$, which is shown in the drawings, is of the mushroom type and would usually be of small size and light weight. This anchor $a$ is suitably secured at the end of the guide-line $b$, as by tying the guide-line to the eye or ring $a'$ of the anchor, the guide-line being sufficiently strong to trip or raise the anchor. The guide-line may be made fast by the fisherman or held by him, as desired, but would usually be fastened, as its function is to provide a guide for the raising and lowering of the fish-line $c$. The fish-line $c$ has attached at its lower end a sinker $d$, and this sinker is provided with a pulley or trolley $e$, which is in contact with the guide-line $b$ and rolls thereon as the fish-line is raised and lowered. The fish-hooks $ff$ are attached to short lines or leaders $gg$, which are attached to the spreader $h$, and the spreader is secured to and extends from the sinker $d$ at each side thereof.

The sinker $d$ is shown as in the shape of a fish and is hollow, having an inner chamber or receptacle which is closed by a screw plug or stopper $i$ and is adapted to contain a greater or less number of small weights $m$, so as to adjust the weight of the sinker, as may be desired, to suit the condition of tide or current or other condition.

The trolley or pulley $e$ is shown as rotatably mounted on a stud $k$, and a spring-clip $j$ is provided which bears against the stud at one side of the pulley and which may be moved backwardly to permit the guide-line $b$ to be engaged with or disengaged from the pulley by an intentional act of engagement or disengagement, thereby avoiding the trouble of always inserting or removing the end of the guide-line for engagement or disengagement with the pulley.

In the use of the fishing-tackle embodying my invention the guide-line will usually first be lowered and the anchor permitted to suitably engage in the bed or bottom, and then the fish-line will be lowered, the sinker running down on the guide-line to the bed or bottom and resting there, with the fish-hooks spread or separated, as shown in Fig. 1. The fish-shaped or fin-shaped sinker provides directing or steering means for holding the spreader at right angles to the current and guiding the spreader in the various movements of the fish-line, so that the leaders and hooks will not become entangled. When a fish is caught upon one of the hooks, the fish-line is raised, the fish taken off, and the hook rebaited and the sinker again lowered.

Where many people are fishing in proximity to each other or many lines are down in proximity to each other, the lines are frequently entangled and confused. This is especially true where many people are fishing from a single boat and from different decks of the same boat, as frequently happens at the fishing-banks in the vicinity of large cities. Not only is there a chance of confusion from the crossing of lines in the acts of raising and lowering them, but also because of the struggles of the captured fish. My invention provides for such a separation and permanency of location of the several lines and such a control of the spreader and hooks by the rudder action of the sinker that all entanglement of lines and uncertainty as to the ownership of the catch may be avoided, while also permitting the fisherman when he has secured a good location at the bed or bottom of the sea to retain that location so long as he desires and to raise and lower his line an indefinite number of times without changing the location of his point of fishing at the bottom or bed of the sea.

It is obvious that various modifications may be made in the construction shown and above particularly described within the spirit and scope of my invention.

What I claim, and desire to secure by Letters Patent, is—

1. A fishing-tackle comprising a guide-line and an anchor secured thereto, a fish-line, a fin-shaped sinker provided with means for engaging with the guide-line, and a spreader for hooks extending laterally from the forward end of the sinker, substantially as set forth.

2. A fishing-tackle comprising a guide-line and an anchor secured thereto, a fish-line, a sinker provided with a roller journaled thereon engaging with said guide-line, a spring-clip confining the guide-line between the roller and the sinker, and a spreader for hooks extending laterally therefrom in a plane parallel to the axis of said roller, substantially as set forth.

3. A sinker for fishing-tackle provided with means for engaging with a line, in combination with a spreader, said spreader extending laterally from the forward part of the body of the sinker, the main body of the sinker shaped to form a fin to maintain the spreader at right angles to the current, substantially as set forth.

In testimony whereof I have affixed my signature in presence of two witnesses.

JOHN W. WALLACE.

Witnesses:
HENRY D. WILLIAMS,
HERBERT H. GIBBS.